US006836847B1

(12) United States Patent
Zinger et al.

(10) Patent No.: US 6,836,847 B1
(45) Date of Patent: Dec. 28, 2004

(54) SOFTWARE PROTECTION FOR SINGLE AND MULTIPLE MICROPROCESSOR SYSTEMS

(75) Inventors: William H. Zinger, Columbia, MD (US); Jerry A. Krill, Ellicott City, MD (US)

(73) Assignee: The Johns Hokins University, Baltimore, MD (US)

(*) Notice: Subject to any disclaimer, the term of this patent is extended or adjusted under 35 U.S.C. 154(b) by 0 days.

(21) Appl. No.: 09/519,187

(22) Filed: Mar. 6, 2000

Related U.S. Application Data

(60) Provisional application No. 60/122,984, filed on Mar. 5, 1999.

(51) Int. Cl.[7] ............................................. G06F 17/00
(52) U.S. Cl. ...................... 713/200; 713/194; 713/193
(58) Field of Search .............................. 713/189–194, 713/200–202, 182–184

(56) References Cited

U.S. PATENT DOCUMENTS

| | | | | |
|---|---|---|---|---|
| 3,643,216 A | * | 2/1972 | Greenaway et al. | 382/115 |
| 4,644,493 A | * | 2/1987 | Chandra et al. | 705/56 |
| 4,747,139 A | * | 5/1988 | Taaffe | 380/44 |
| 4,817,140 A | * | 3/1989 | Chandra et al. | 705/55 |
| 5,117,457 A | * | 5/1992 | Comerford et al. | 713/194 |
| 5,710,814 A | * | 1/1998 | Klemba et al. | 713/173 |
| 5,832,207 A | * | 11/1998 | Little et al. | 713/200 |
| 6,771,446 B1 | * | 8/2004 | Noble | 713/200 |
| 6,775,778 B1 | * | 8/2004 | Laczko et al. | 713/194 |
| 6,782,479 B1 | * | 8/2004 | Williams et al. | 713/194 |

OTHER PUBLICATIONS

Ze et al., A research on system–level architecture of single–chip cryptographic data processing, Communications, Circuits and Systems and West Sino Expositions, IEEE 2002, International Conference on, vol. 2, Jun. 29–Jul. 1, 2002, pp. 1486–1490.*
McLoone et al., A single–chip IPSEC cryptograhic processor, Signal Processing Systems, 2002, IEEE Workship on, Oct. 16–18, 2002, pp. 133–138.*
DuPont et al., Robustness IPs for reliability and security of SoCs, Test Conference, 2002,. Proceedings, Interenational, Oct. 7–10, 2002, pp. 357–364.*

* cited by examiner

Primary Examiner—David Jung
(74) Attorney, Agent, or Firm—Benjamin Y. Roca, Esq.

(57) ABSTRACT

Protection is provided for software and data in single and multiple microprocessor system, including, but not limited to, local area networks (LANs), wide area networks (WANs), backplane connected architectures, etc. The data can include databases, streaming data and code. The protection is provided by employing, singly or in combination, obscurant IC coatings, tamper detection and response circuitry, multiple component modules and software code encryption to prevent software from being stolen or altered. The software or data is protected during transport, during downloading into a processor or processor network, and also during execution and storage of code or a database within a host system. The data product resulting from processing within the protecting equipment may be encrypted to be sent safely to external locations were it may be stored or de-encrypted for further use.

12 Claims, 5 Drawing Sheets

PROCESSOR BOARD WITH MULTIPLE DE-ENCRYPTION
DEVICES WITHIN A MULTI-CHIP MODULE

PRIOR ART PROCESSOR BOARD CONNECTED
TO TYPICAL SYSTEM ELEMENTS

FIG. 2 ARCHITECTURE FOR A TAMPERPROOF COMPUTER SYSTEM

PROCESSOR BOARD WITH DE-ENCRYPTION WITHIN A MULTI-CHIP MODULE

PROCESSOR BOARD WITH MULTIPLE DE-ENCRYPTION DEVICES WITHIN A MULTI-CHIP MODULE

PROCESSOR BOARD WITH IN-LINE REAL-TIME DE-ENCRYPTION WITHIN A MULTI-CHIP MODULE

SOFTWARE PROTECTION FOR SINGLE AND MULTIPLE MICROPROCESSOR SYSTEMS

CROSS-REFERENCE TO RELATED APPLICATIONS

This application claims the benefit of prior filed co-pending U.S. Provisional application No. 60/122,984, filed on Mar. 5, 1999.

STATEMENT OF GOVERNMENTAL INTEREST

This invention was made with Government support under Contract No. N0002498-D-8124 awarded by the Department of the Navy. The Government has certain rights in this invention.

BACKGROUND OF THE INVENTION

1. Field of the Invention

The present invention provides both software and data protection for single or multiple microprocessor systems such as, local area networks (LANs), wide area networks (WANs), backplane connected processor architecture, etc. More particularly, the present invention provides protection by employing, singly or in combination, obscurant IC coatings, tamper detection and response circuitry, multiple component modules and software code encryption to prevent software from being stolen or altered. Similarly, encryption can be applied to data bases and streaming data to provide protection.

2. Description of the Related Art

Commercial processor boards contain several components with a central processing unit (CPU) as a separate component from volatile and non-volatile memory. Often, the executable code for sets of applications is stored in some device, possibly removable, such as but not limited to, a floppy disk, hard drive, CDROM, or EPROM. The executable code is easily accessible to unauthorized parties and, if not encrypted, can be easily reconstructed in any of a number of formats that would facilitate unauthorized modification or use. Even when supplied in encrypted form, the need to decrypt the code before sending it to the processor makes it available on accessible connections where it can be collected by appropriate probes in its decrypted form. Thus, even use of key encryption, whether public/private key or some other type, does not stop the pirating, sabotaging or accessing of computer programs that may be proprietary. A parallel argument applies to databases and on-line streamed data. Coating of multi-chip components, for example, multiple custom IC chips on a common substrate, has been proposed to protect knowledge of custom circuitry logic and inter-chip interaction, for example. Although using the emerging technology of commercial coatings on individual integrated circuit chips or components can protect the decrypted program from being read directly by obscuration from electrical or radiative probing, it does not prevent access to probing inter-component conductor paths over which data and code are transferred. This information can easily be read by probing between components.

Thus, nothing has been done to protect computer programs and data passing between components in processors, whether custom or general-purpose commercial processors such as those used in personal computers and workstations.

SUMMARY OF THE INVENTION

It is an object of the present invention to prevent software, databases and streamed data in processors from being stolen, sabotaged or accessed.

It is a further object of the present invention to protect the software or database not only during transport but also during downloading into a processor or processor network and during execution and storage of the code or database within the host system.

It is another object of the present invention to provide protection with no slowdown in processing system performance when it is used to protect software and databases.

It is yet another object of the present invention to use obscurant coatings and tamper detection and response circuitry, singly or in combination, multiple component modules and software code and data encryption in a manner to protect software and data passing between components.

It is yet another object of the present invention to provide a non-standard processor circuit board with respect to its architecture and component arrangement as compared to related art.

It is a further object of the present invention to provide a processor circuit board capable of interacting in standard fashion with other standard processor boards and components over back-plane busses, LANs, WANs and other interconnection methods.

These objects are achieved by providing a novel form of a general-purpose processor/computer having at least three integrated circuit (IC) components mounted on a single substrate as a multi-component module (MCM) including a CPU, one or more memory chips and one or more custom chips containing at least one each of a de-encryption key and algorithm for converting an encrypted computer program as it is received over a bus from a non-volatile memory. Further, an obscurant coating can be used to cover the chips, interconnection circuits and other elements within the multi-component module. The obscurant coating can be used alone or in combination with tamper detection and response circuitry, or the tamper detection and response circuitry may be used alone. The multi-component chip module can be provided in a bus configuration with other multi-component chip modules and one or more memory chips.

Alternatively, the de-encryption may be built into the CPU chip, or a computer program operating in the CPU could perform the de-encryption.

A method for protecting a processor system from tampering is also provided by mounting IC components on a single substrate as a multi-component chip module, converting an encrypted computer program, encrypted code or encrypted data into its original unencrypted form, sending the de-encrypted computer program, code or data to appropriate locations in memory located in the multi-component chip module, protecting these memory locations from external access, and protecting the multi-component chip module using one or a combination of obscurant, deceptive patterns and tamper detection/destruction mechanisms.

These objects, together with other objects and advantages which will be subsequently apparent, reside in the details of construction and operation as more fully described and claimed hereinafter, reference being had to the accompanying drawings forming a part hereof, wherein like reference numerals refer to like parts throughout.

DESCRIPTION OF THE PREFERRED EMBODIMENTS

The present invention is directed to a tamper resistant processor system that prevents software, databases or streamed data from being stolen due to piracy, sabotage i.e., virus or unauthorized modification, or access to proprietary algorithms and/or stored/processed data, in addition to other vulnerabilities. The present invention protects the software, database or streamed data during transport and also during downloading into a processor or processor network. In addition, it also protects the software, database or streamed data during execution and storage of code within the host system.

Figure 1:
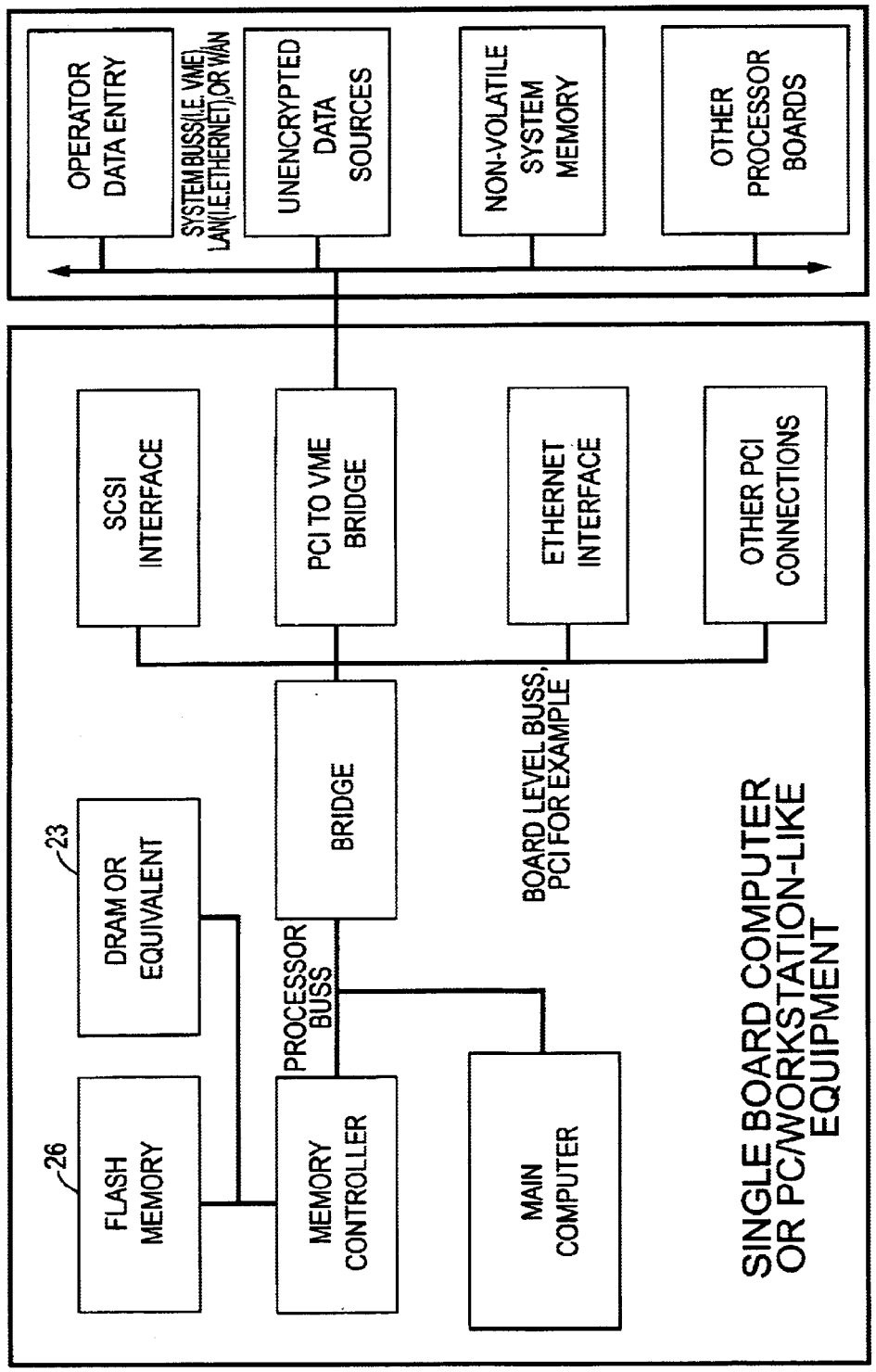
FIG. 1 is a block diagram of a prior art processor board in a back-plane buss environment.

Normally, commercial processor boards contain several components. As shown in prior art FIG. 1, a central processing unit (CPU) is a separate component from volatile and non-volatile memory components, which store executable code as well as input data and processed data. Code or data is, for example, supplied from a card that is external to the processor board. This code or data could be supplied on the card in encrypted form so that the code or data would be protected if the card were to be obtained by an unauthorized person. The encryption technique can include public/private key encryption, etc. However, the lines of code or data must be decrypted prior to execution or other authorized use. It is at this point where the re-translated code or data is stored and accessed by a processor/controller that a skilled tamperer could access the code or data for unauthorized use. For example, probing the connections between components allows decrypted code or data transfers from memory to the CPU to be accessed and reconstructed. Commercial coatings are beginning to appear for use on individual integrated circuit chips or components to protect the decrypted program from being directly read by way of obscuration from electrical or radiative probing. Tamper detection and response chips are being developed that can take appropriate action, say clearing memory, when a tamper attempt is sensed. Encryption/decryption processes are being considered for incorporation in computer chip sets to prevent unauthorized access from network connections. However, these techniques do not prevent access to probing inter-component conductor paths over which data and code are transferred.

The present invention overcomes this problem and prevents access to probing inter-component conductor paths by using the known approaches of obscurant IC coatings, tamper detection and response circuitry, multiple component modules and software code encryption in a novel way to protect software when computing, and particularly, in general purpose computing.

For example, an obscurant coating is placed on chips, interconnection circuits and other elements within a module housing, so that if a laser or optical device tries to detect information, the information cannot be read. Further, the adhesive nature of the obscurant, coupled with module lid construction, can prevent its removal without irretrievably damaging the IC and the information contained thereon. Tamper detection and response circuitry could clear memory, destroy the de-encryption key and alter the de-encryption circuitry, for example.

The present invention will first be described for the case in which only a computer program code is to be protected.

Figure 2:
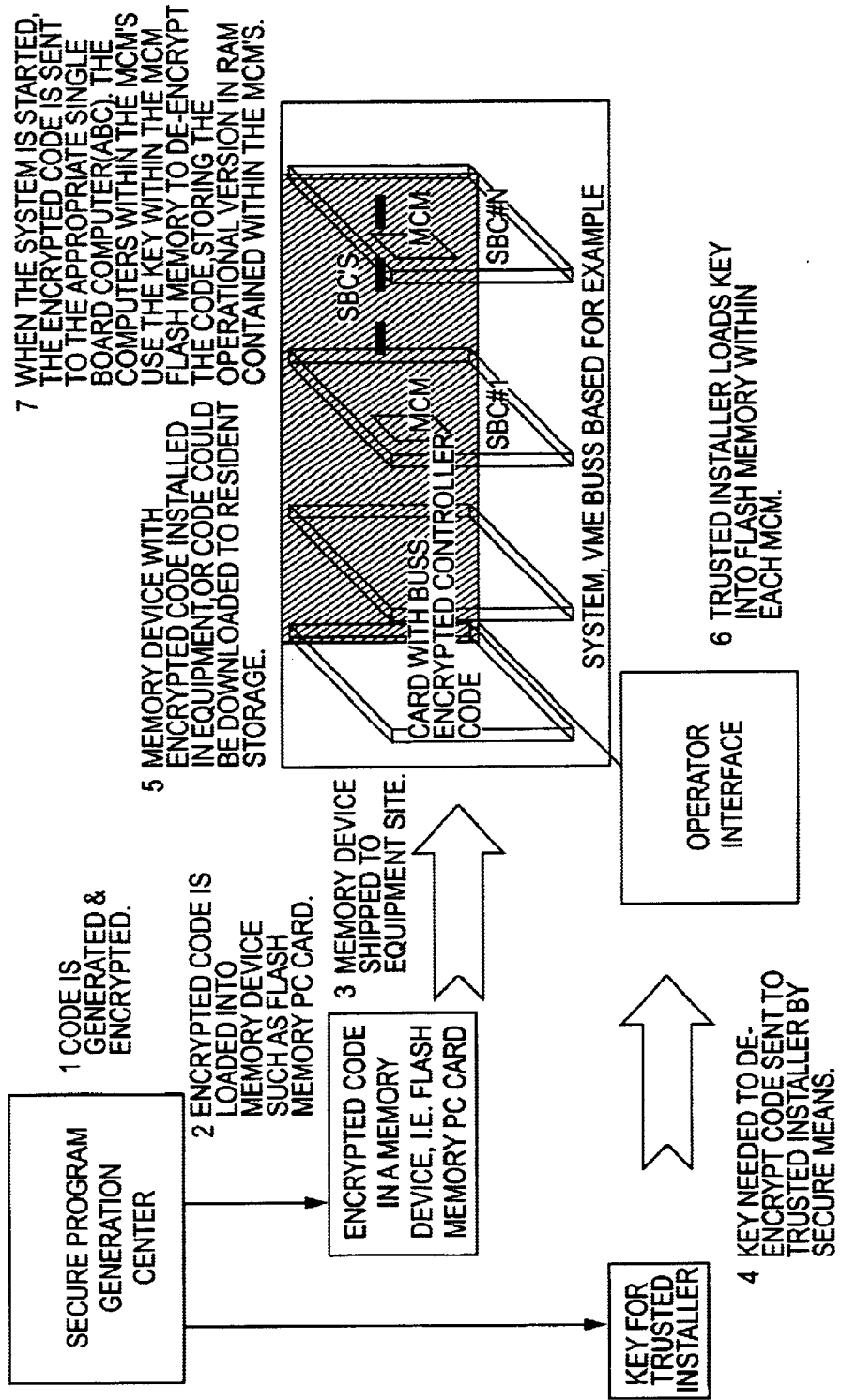
FIG. 2 is a block diagram of the architecture of the tamper resistant computer system according to the present invention.

As shown in FIG. 2, lines of code in a computer program (or programs) are first encrypted (1) so that each line is coded with a protected random encryption sequence. This generally requires an encryption algorithm with a unique encryption key to randomly "seed" the algorithm. Thus, the same key and corresponding algorithm are the only direct way to decode the program lines of code. This is a conventional cryptography practice. It is important that the "crypto key" and algorithm be protected at the encryption site by standard security measures. The encrypted code is entered into a nonvolatile memory (2) such as a soft or hard disk or, as shown in FIG. 2, an erasable, programmable read only memory (EEPROM) component mounted on a flash memory PC card, etc. This allows the program to be readily transported and stored, yet be protected by its encrypted form. This is another known approach.

To access and use this program in a manner that is protected from tampering, the present invention has been proposed. The present invention includes a general-purpose processor/computer (processor board). The processor board of the present invention differs from prior art devices in its architecture and component arrangement.

Figure 3:
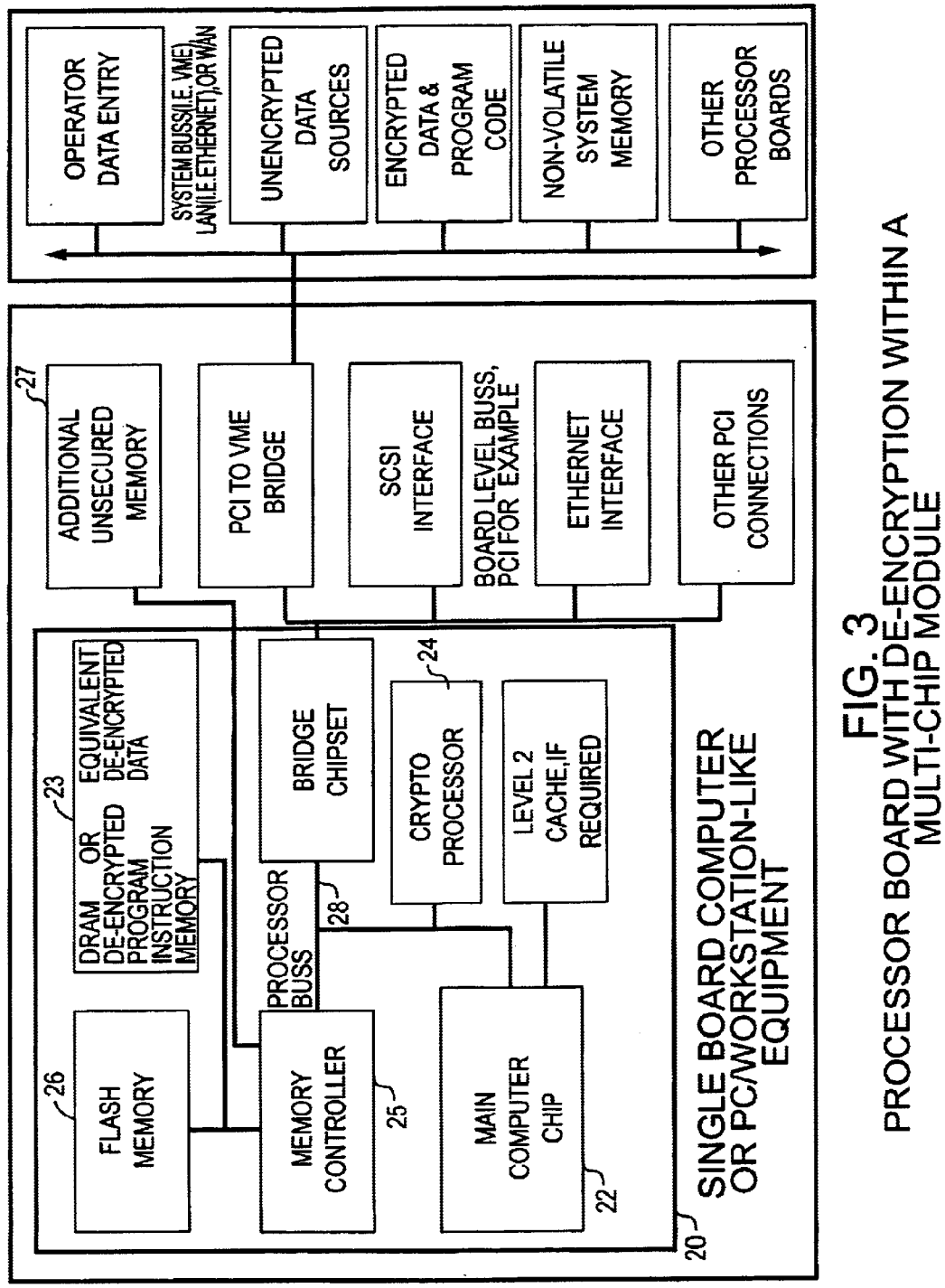
FIG. 3 is a block diagram of a processor board having an encryption processor located thereon according to the present invention in a back-plane buss environment.

One example of an architecture and component arrangement of the processor board according to the present invention is shown in FIG. 3 where code alone is being protected. As shown in FIG. 3, three or more IC components are mounted on a single substrate as a multi-component module (MCM) 20. The components of this processor board include a CPU 22, which can be a standard commercial CPU, and memory chips including volatile memory 23 (DRAM or equivalent) and non-volatile memory 26 (Flash memory, EEPROM, etc.). In addition, a new type of custom chip 24 contains a de-encryption key input and algorithm. Memory controller 25 operates to select between secured memory and unsecured memory. Thus, an additional unsecured memory 27 can not access internal memory. Further, processor buss 28 functions within the MCM 20 via the memory controller 25 so that unencrypted data from, for example, the additional unsecured memory 27 is isolated from encrypted data, etc.

FIG. 2 illustrates how the encrypted code and the de-encryption key are brought together at the computer system. Under CPU 22 and memory controller 25 control, the key is loaded from a flash memory 26 within the MCM 20. The chip 24 then converts, for example, in this case, the encrypted computer program as it is received over, for example, a bus 28 from the Flash memory 26, into its original unencrypted form and, under CPU 22 control, sends the de-encrypted program(s) to appropriate locations in memory IC(s) 23, 26, etc., that are located in the MCM 20. Thus, the complete computer program to be executed is available to the processor from high-speed memory in unencrypted form. This arrangement removes de-encryption delays to the start-up process allowing the CPU 22 direct access to the critical instruction access path of the processor during program execution, thereby providing code protection, yet full processing system performance.

In an alternative architecture, the de-encryption circuit could be made a part of the CPU 22 chip, thereby reducing the chip count in the MCM 20. In yet another example, a computer program operating in the CPU 22 could perform the de-encryption. When processing speed does not need to be maintained, this software approach could run continuously, reducing the memory requirements within the MCM 20. The current art would allow incorporation of sufficient high-speed memory within the MCM 20 to contain very large computer programs. The components within the MCM 20 housing, including the custom chip 24 (crypto-processor chip), CPU 22 and memory ICs 23, 26, etc., mounted on a common substrate, can be coated with obscurants, provided with unused and deceptive patterns, and/or provided with tamper detection/destruction mechanisms. These will serve to protect the de-encryption key and algorithm, the stored de-encrypted computer program(s) and the intermediate processed data that is temporarily stored in the module memory that could reveal processing algorithms of the protected computer programs. The resulting processor board can be commercially produced and yet retain the same connector pin locations, voltages and software support as current commercial boards. It should be noted that although the above has been described with regard to an encrypted computer program, the present invention is also applicable to encrypted code and encrypted data.

Figure 4:
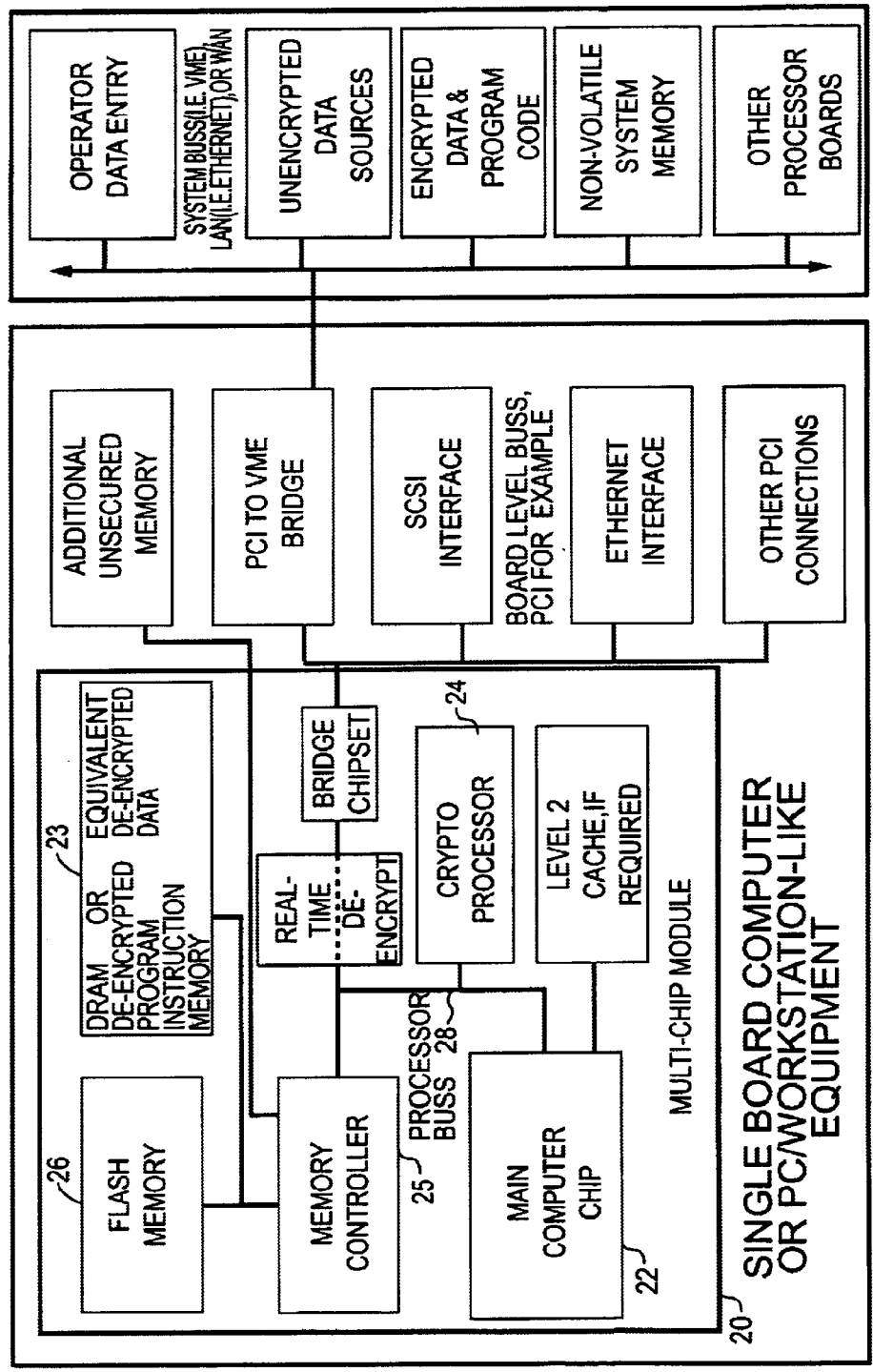
FIG. 4 is a block diagram of a processor board having multiple encryption processors located thereon according to the present invention providing for encryption processes applied separately to code and data with feed-through of un-encrypted code and data in a back-plane buss environment.

FIG. 4 shows the addition of data path encryption/de-encryption to the code protection circuitry in FIG. 3. Here the capability to maintain processor performance without affect from the encryption/de-encryption circuit would be dependent on the size of the data memory within the MCM 20 compared to the data base size, or to the timing nature of the streamed data.

Figure 5:
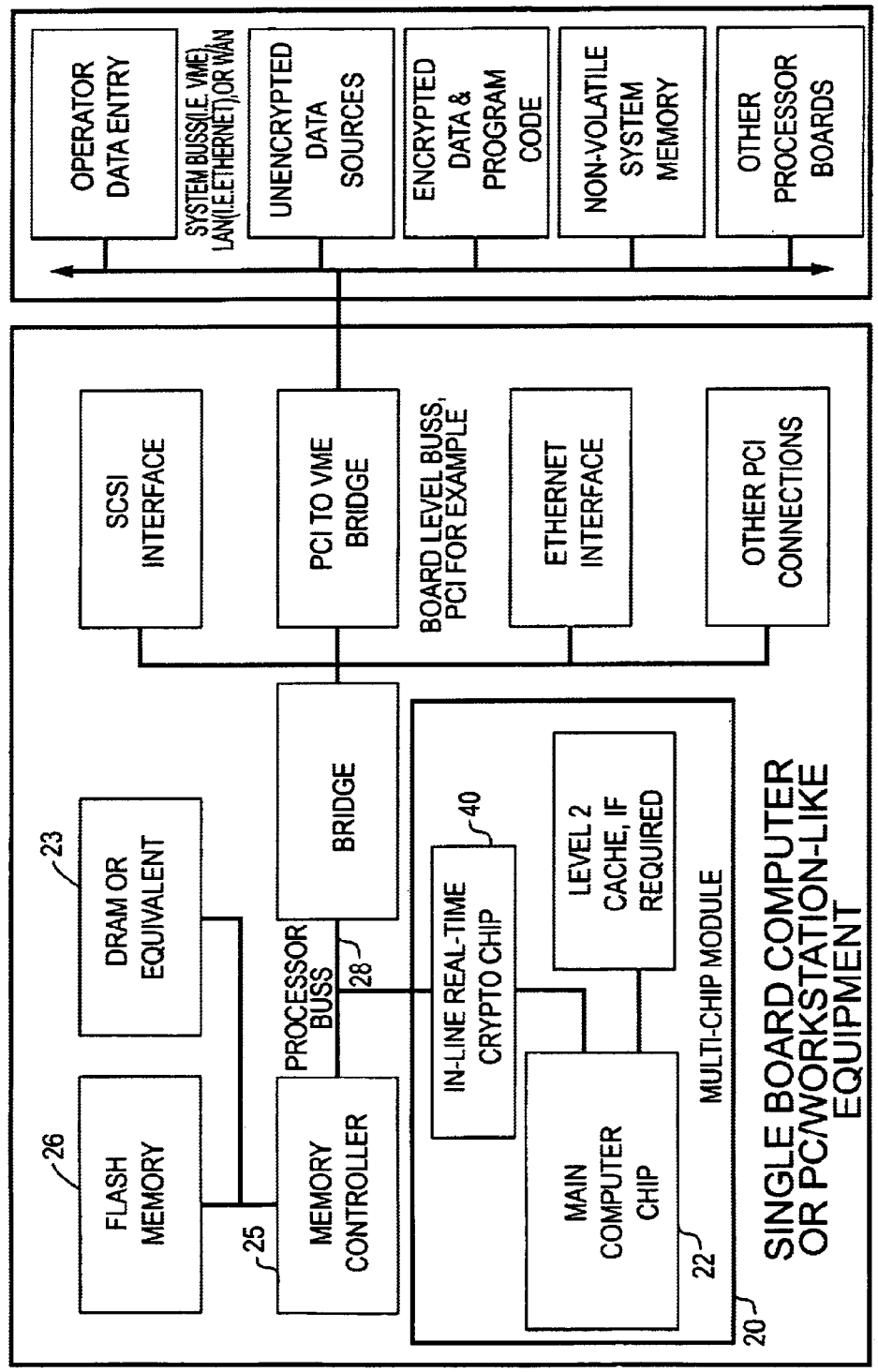
FIG. 5 is a block diagram of a processor board having direct, in-line, real time de-encryption and encryption logic in a back-plane buss environment.

FIG. 5 shows a configuration using a direct, in-line, real time de-encrypt logic chip 40. In this configuration, the delay through the de-encrypt logic chip 40 adds to memory access time. For data protection, the MCM 20 would encrypt output to the memory.

With respect to employing obscurants on the MCM 20, types of obscurants that can be used include, for example, BORDEAUX, Chipseal™ (Dow Corning), etc., but are not limited thereto. BORDEAUX offers, for example, an economical wafer level protective technology which includes screen printing of an opaque layer followed by the deposition of an etch resistant material to inhibit the reverse engineering of an integrated circuit. The coating provides protection using a thin layer on the integrated circuit of approximately 10–25 $\mu$m. The obscurant coating is compatible with plastic, ceramic and multichip assemblies and is inexpensive.

Thus, the present invention provides a new processor board, commercial or otherwise. An encrypted computer program is stored in the non-volatile memory 26 such as an EEPROM, Flash memory, etc. The non-volatile memory board 26 can be operated itself or as part of a bussed or local area network (LAN) architecture with connectivity to processor boards. The more general multiple processor network will be considered first in describing the invention. Upon powering up the computing network, the various computer programs stored in the non-volatile memory 26 are sent to their addressed destinations on each of the processor boards. This is a standard process. Next, according to the novel features of the present invention, on the special processor boards, as shown in FIGS. 2 and 3, appropriate programs are routed into the de-encryption component 24 within the destination processor's multi-chip module 20. Then, after each program line of code has been decrypted using the key and algorithm stored at appropriate locations in the multi-chip module 20, the code is sent from the de-encryption component to the appropriate memory locations in the memory components also located in the MCM 20. Each of the processors is now ready to perform its processing functions by their respective CPUs using their memory on the module, as does a conventional processor, with no performance affect due to the code de-encryption process. Further, input/output data are sent through the same input/output interfaces as a conventional board. That is, it goes from/to other processors for further operations, or to a system input/output. Or, as embodied in FIG. 4, input/output data itself may be de-encrypted/encrypted with, possibly, some small reduction in total processing performance.

The present invention can be used on specialized or personal computer configurations. In a personal computer, the configuration would vary from FIG. 2 in that the Flash Memory PC Card 26, shown would be replaced with a floppy, CDROM or hard disk/drive, for example, for insertion of the encrypted computer program(s). Thus, there would be only one of the above-described processor boards of the above-described design. In addition, the bus 28 could be replaced with a direct interface to the disk drive. The process for program down loading, de-encryption and operation would be the same as described above.

Thus, the general processor board of the present invention, in a bus configuration with other boards or as a single board and a non-volatile memory such as an EEPROM, Flash memory, etc., protects the software, encryption process, and intermediate data from compromise. It should be noted that this configuration would allow the board to be interchanged with a conventional board one-for-one in an existing system, subject to implementation of the encryption process. Further, the present invention can protect entire local area networks (LANs), wide area networks (WANs), backplane connected processor architecture, etc., such that all the computer programs, software and data on the network, etc., is protected. Subject to the use of an adequately secure encryption technology, this approach would permit system operation of LANs and WANs at multiple levels of classification. Need-to-know and classification level would be controlled by the key assigned to individuals. This key could be an alphanumeric sequence used in a conventional password entry format, or it could be a physical device similar to the key used to enable and set security level for secure telephone systems. The data would remain in its encrypted form everywhere in the network except at key controlled input and output devices. The network could then handle a range of security levels and content access permissions. It should be noted that the present invention is not limited to the examples mentioned above.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A tamper resistant processor system, comprising:
   a multi-component chip module (MCM) including:
      a single CPU;
      one or more memory chips;
      one or more chip means containing at least one each of
         a de-encryption key and algorithm therein;

an obscurant covering the contents of said multi-component chip module;

further comprising said multi-component chip module in a bus configuration with other multi-component chip modules and said one or more memory chips;

further comprising a memory clear feature; and further comprising de-encryption key and algorithm self-destruct feature.

2. A tamper resistant processor system, comprising:

processor boards;

processing chip;

an encrypted computer program;

a non-volatile memory, operatively connected to said processor boards, for storing said encrypted computer program and sending said encrypted computer programs to address destinations on said processor boards;

multi-component chip modules for receiving and de-encrypting said encrypted computer program and sending said de-encrypted computer programs to memory components on said multi-component chip modules;

wherein said computer program requires no token to activate or authorize use; and wherein said computer program is loaded onto a chip.

3. A method for protecting a processor system from tampering, said method comprising the steps of:

a) mounting IC components on a single substrate as a multi-component module or as the contents of a multi-component module;

b) converting an encrypted computer program, received over a bus from a non-volatile memory, into its original un-encrypted form;

c) sending the de-encrypted computer program to appropriate locations in memory located in the multi-component module;

d) protecting the multi-component module using one or a combination of an obscurant, deceptive patterns, and tamper detection/destruction mechanisms; and e) wherein said deceptive pattern comprises decoy mounted IC components.

4. A tamper resistant processor system, comprising:

processor boards;

encrypted code;

a non-volatile memory, operatively connected to said processor boards, for storing said encrypted code and sending said encrypted code to address destinations on said processor boards;

multi-component chip modules for receiving and de-encrypting said encrypted code and sending said de-encrypted code to memory components on said multi-chip modules; and further comprising controls for user authorization at multiple security levels.

5. A tamper resistant processor system, comprising:

processor boards;

encrypted data;

a non-volatile memory or network data source, operatively connected to said processor boards, for storing said encrypted data and sending said encrypted data to address destinations on said processor boards and for receiving and storing encrypted data resulting from the processing of the input data;

multi-component chip modules for receiving and de-encrypting said encrypted data, sending said de-encrypted data to memory components on said multi-chip modules, for storing the results of processing the de-encrypted data, and for encrypting the results before sending to storage or network external to the multi-component chip modules; and further comprising controls for user authorization at multiple security levels.

6. A method for protecting a processor system from tampering, said method comprising the steps of:

a) mounting IC components on a single substrate as a multi-component module or as the contents of a multi-component module;

b) converting encrypted data, received over a bus from a non-volatile memory, into its original unencrypted form;

c) sending the dc-encrypted data to appropriate locations in memory located in the multi-component module;

d) encrypting processing result data that is being sent to storage or networks external to the multi-component module; and e) protecting the multi-component module using one or a combination of an obscurant, deceptive patterns, and tamper detection/destruction mechanisms; and f) wherein said deceptive pattern comprises decoy mounted IC components.

7. A tamper resistant processor system, comprising:

a multi-component chip module including:

a single CPU;

an in-line real time de-encryption chip;

one or more memory chips, operatively connected to said in-line real time de-encryption chip, said multi-component chip module encrypting out put to said one or more memory chips;

a memory controller selecting between secured and un-secured memory over a processor bus; and said de-encryption chip allows multilevel security de-encryption.

8. A tamper resistant processor system according to claim 7, wherein said chips possess an obscurant covering.

9. A tamper resistant processor system according to claim 7, wherein said chips possess a self-destruct function.

10. A tamper resistant processor system according to claim 9, wherein said self-destruct function destructs after first use.

11. A tamper resistant processor system according to claim 1, wherein said encryption algorithm is randomly encrypted.

12. A tamper resistant processor system according to claim 1, wherein de-encryption key and algorithm self-destruct after one use.

* * * * *